April 20, 1926.
O. A. FREDERICKSON
1,581,571
CONDUIT COUPLING
Filed April 14, 1925
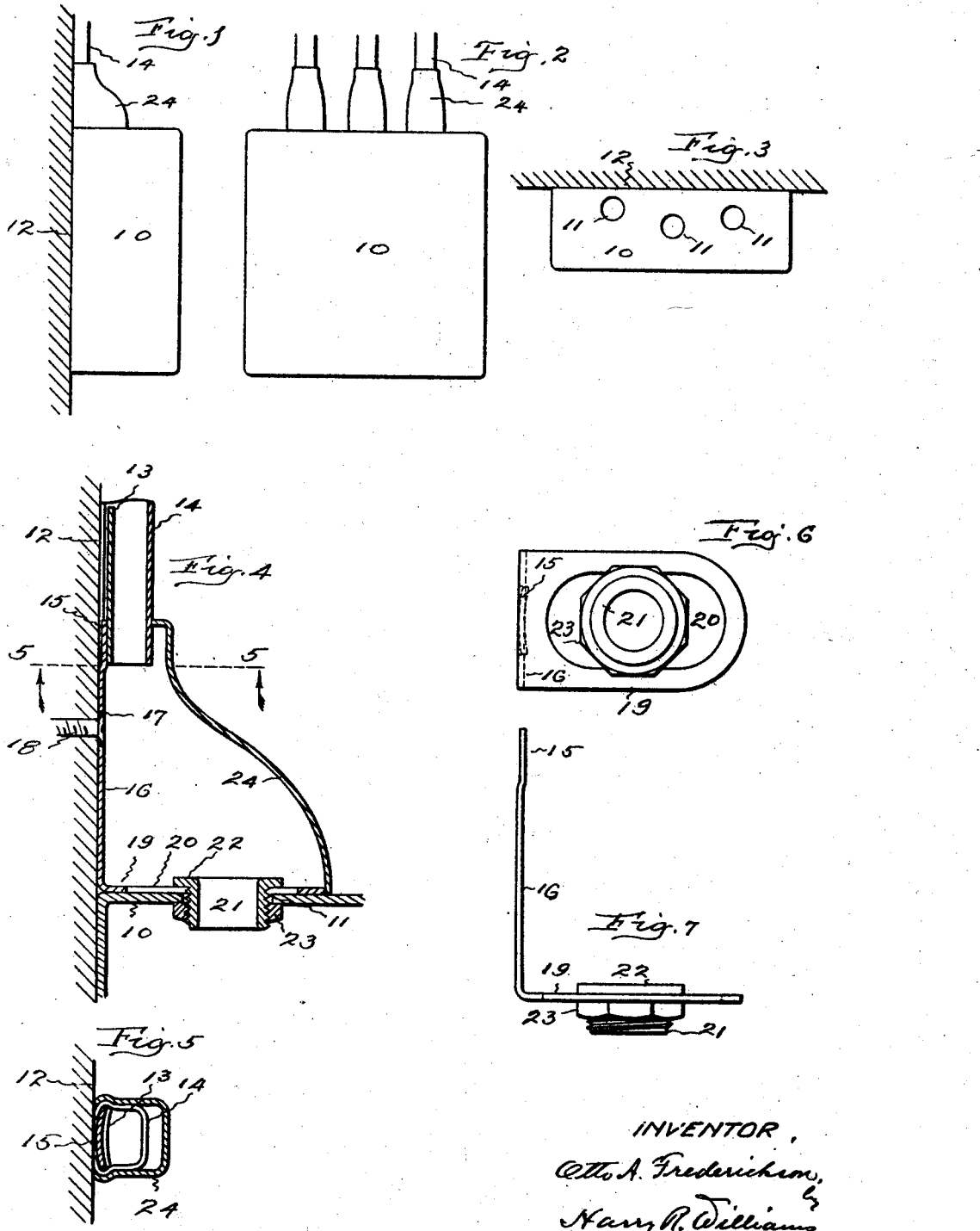

Patented Apr. 20, 1926.

1,581,571

UNITED STATES PATENT OFFICE.

OTTO A. FREDERICKSON, OF HARTFORD, CONNECTICUT, ASSIGNOR TO THE AMERICAN WIREMOLD CO., OF HARTFORD, CONNECTICUT, A CORPORATION OF CONNECTICUT.

CONDUIT COUPLING.

Application filed April 14, 1925. Serial No. 23,110.

*To all whom it may concern:*

Be it known that I, OTTO A. FREDERICKSON, a citizen of the United States, residing at Hartford, in the county of Hartford and State of Connecticut, have invented a new and useful Improvement in Conduit Couplings, of which the following is a specification.

This invention relates to a fitting which is designed to connect molding conduits for concealing electric circuit wires with conduit boxes, safety switch cabinets, cut-out cases, panel boxes and the like.

Such closures or boxes usually have sections that are broken away to provide openings for the attachment of conduits and the passage of circuit wires, and these knock-outs are located in the various types and sizes of boxes at different distances from the surface over which the wires and conduit are run. It sometimes occurs that in the same box wall the distances from the back of the box to the centers of the knock-outs vary. Previously to fit the conduit ends to the knock-outs it has been necessary to bend the conduits outward, and where there were a plurality of conduits connected with the box it was a somewhat difficult and laborious operation to get good bends and ensure a uniform appearance for the installation.

The object of this invention is to provide conduit couplings which are so constructed that they can be readily connected with the side walls of boxes having knock-outs at different distances from the backs, without bending the ends of the conduits, thus saving labor and ensuring a uniform appearance of the installation where there are a number of conduits connected with the box, and at the same time providing ample space for joining wires and leaving no opening between the backs of the conduits and the surface to which the box is fastened.

In the accompanying drawings Fig. 1 shows a side elevation of a switch box with the end of a conduit connected therewith by means which embody this invention. Fig. 2 shows a front view of the same. Fig. 3 shows a top view of a box representing the knock-outs at different distances from the surface to which the box is fastened. Fig. 4 shows a vertical section on larger scale of the end of a conduit connected to the side wall of a box by a fitting made in accordance with this improvement. Fig. 5 is a section taken on the dotted line 5—5 on Fig. 4. Fig. 6 shows a face view of the coupling. Fig. 7 shows an edge view of the coupling.

In the views 10 indicates a conduit box, or switch enclosing cabinet, or cut-out case, or panel box. In the top wall of this box are openings 11, which openings for the purpose of illustration are shown as varying considerably in distances from the wall 12 to which the box is fastened.

The conduit illustrated is of the type which comprises a running base strip 13 and a channel-shaped cap 14 that is applied to the base and contains the wires. Previously such a conduit has been connected with the box by means of an angle bracket, one section of which has a tongue adapted to be inserted between the ends of the base strip and channel cap, while the other section has a knock-out or opening for the wires at a definite height. The bracket and the conduit end after having been located in position have been enclosed with a cover piece. As the openings in the boxes to which the couplings are applied are different distances from the backs of the boxes and the openings in the brackets have been at a fixed distance from the backs, it has been necessary to bend the base strips and channel caps so that the wire-way would coincide with the openings in the boxes. This bending operation besides requiring considerable skill and the expenditure of much time and labor in order to make the bends uniform and give an installation in which there were a plurality of conduits, a neat appearance, left spaces between the conduits and the wall to which the boxes were fastened.

In order to eliminate the necessity of bending the conduits and save time and labor, the angle bracket of the present invention is made with a tongue 15 at the end of the back section 16, which is designed to be thrust into the conduit between the end of the base strip 13 and cap 14. The back section is also provided with a hole 17 for the passage of a screw 18 by means of which the bracket may be fastened to the wall. The forwardly extending section 19 of the bracket is formed with an elongated slot 20. Extending through this slot is a bushing 21 that has a flanged head 22 at one end. The other end of the bushing has an exterior thread turning upon which is a lock nut 23. When the nut is loosened the bushing is free to be slid along the slot so that the opening through the bushing may be registered with the opening in the box to which the conduit is to be coupled.

In making the connection the bracket is joined with the conduit and the bushing inserted through the opening in the wall of the box. The bracket is then secured in position against the supporting wall with the end of the conduit flat against the wall. This is readily accomplished as the bushing is free to slide along the bracket. After the parts have been located the nut is turned on the bushing and edges of the opening in the box clamped between the flanged head of the bushing and the nut. When the parts are thus secured a cover 24 having one end shaped to fit the bracket and the other shaped to fit the conduit is placed over the bracket with one end abutting against the wall of the box and the other end sprung into engagement with the tubular cap of the conduit, and the back flat against the supporting wall.

With this construction conduits may be quickly coupled to boxes with the wire holes in the brackets and in the walls of the boxes correctly registered regardless of the distance of the box holes from the back of the box, without bending the conduits to make the holes coincide. Before the covers are placed in position the circuit wires may be readily passed through the bushing and into the box or joined to leads from the box, there being sufficient space in the covers for this purpose.

The invention claimed is:—

1. Means for coupling the end of a conduit with a casing, comprising an angular bracket having two sections and having means at the end of one section for connection with a conduit, and having a bushing and means for adjustably mounting said bushing on the other section.

2. Means for coupling the end of a conduit with a casing comprising an angular bracket having two sections and having a tongue at the end of one section for engaging with a conduit, and having a bushing and means for adjustably mounting said bushing on the other section.

3. Means for coupling the end of a conduit with a casing comprising an angular bracket having two sections and having means at the end of one section for connection with a conduit, and having a slot in the other section, a headed bushing fitting said slot, and a lock nut turned on the bushing.

4. Means for coupling the end of a conduit with a casing comprising a bracket having a back section for attachment to a wall and a tongue at the end of said section for connection with a conduit, and having a forwardly extending section with an elongated slot, a bushing adjustably mounted in said slot, and a nut threaded on said bushing.

5. A conduit coupling bracket having a back section with a projecting tongue and means whereby it may be fastened to a wall, and a section extending at right angles thereto, said latter section having an elongated slot, with a threaded bushing fitting the slot, said bushing having an elongated head at one end and nut turning on the other end.

OTTO A. FREDERICKSON.